United States Patent [19]
Duker

[11] 3,712,775
[45] Jan. 23, 1973

[54] HOPPER LOADING EXTRUSION APPARATUS

[75] Inventor: Dorothy J. Duker, Fort Worth, Tex.

[73] Assignee: Vistron Corporation, Cleveland, Ohio

[22] Filed: April 16, 1971

[21] Appl. No.: 134,714

[52] U.S. Cl. ............................ 425/186, 425/447
[51] Int. Cl. .................................. B29f 3/01
[58] Field of Search ....... 425/186, 190, 447, 131, 376

[56] References Cited

UNITED STATES PATENTS

| | | | |
|---|---|---|---|
| 1,914,740 | 6/1933 | Greene | 425/447 X |
| 2,642,644 | 6/1953 | Robinson | 425/447 |
| 3,497,914 | 3/1970 | Typout | 425/131 |
| 3,577,494 | 5/1971 | Chisholm et al. | 425/131 X |

*Primary Examiner*—R. Spencer Annear
*Attorney*—John F. Jones and Sherman J. Kemmer

[57] ABSTRACT

A device for loading the hopper of an extruder which is easily moved into and out of engagement with the top of the hopper is described.

3 Claims, 5 Drawing Figures

PATENTED JAN 23 1973

INVENTOR.
DOROTHY DUKER

BY John F. Jones

ATTORNEY

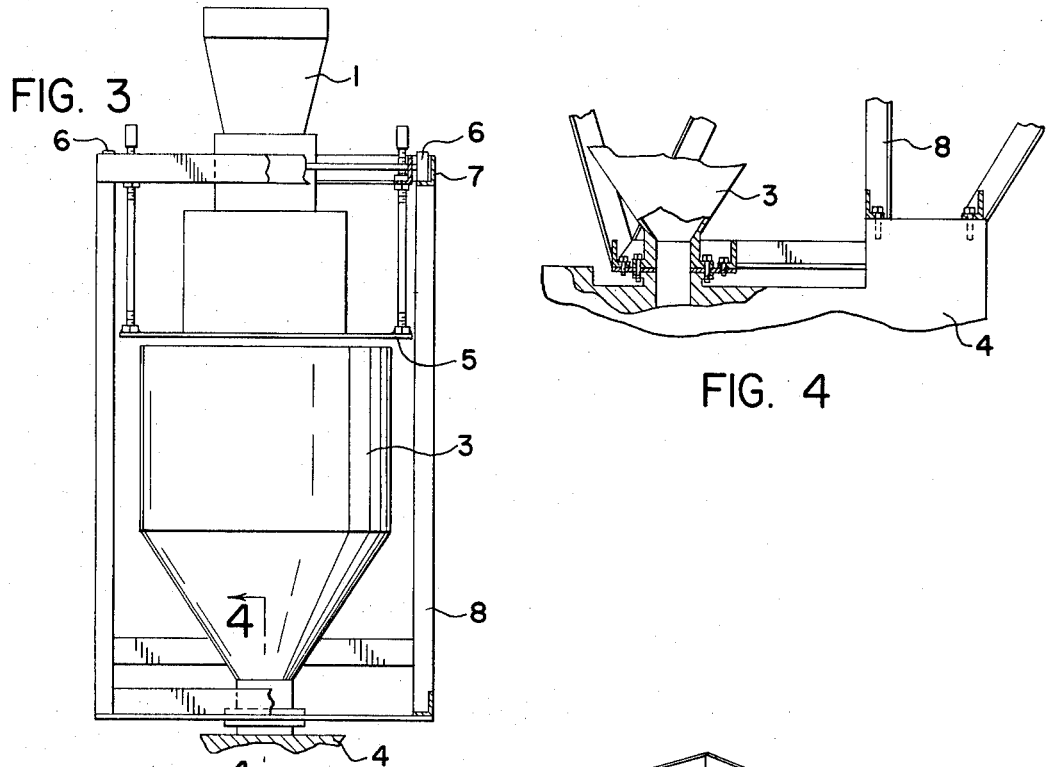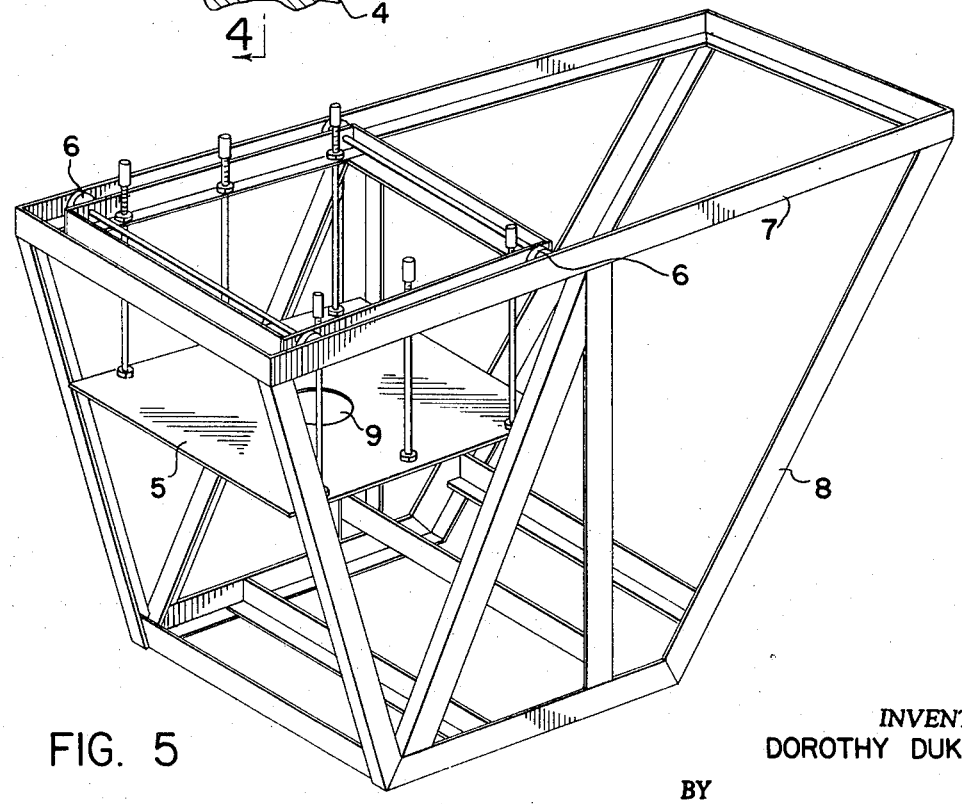

HOPPER LOADING EXTRUSION APPARATUS

This invention is concerned with a hopper loading apparatus and more particularly pertains to an apparatus comprising a frame having tracks on which is movably mounted a device for loading hoppers on an extrusion machine and the like.

Extrusion machines are well known in the art and particularly plastic extrusion machines to which are added, usually through a hopper at one end of the machine, granular or powdered plastic material which is passed through a plastifying zone usually at elevated temperatures to form a plastic mass which is extruded from the other end of the machine usually through a shaping die to form the desired shape of the plastic material. Such extrusion machines employ screw and plunger devices for pressuring the plastified plastic through the extrusion die and are used to make plastic strands, tubes, pipes, and the like.

In extrusion machines, or extruders, it is necessary to add the powdered or granular plastic material to the hopper during the extrusion operation from time to time to insure uninterrupted extrusion operation. Usually this addition of plastic material to the hopper is done by hand or by means of a loader which can be raised and attached to the top of the hopper. Whenever a change in the type of color of plastic material to be added to the hopper is required, it is necessary to detach the hopper loader.

According to my invention, a hopper loading apparatus is provided which is easily and quickly mounted to or dismounted from the top of the hopper so that resin changes can be made quickly usually without interruption of the extrusion process. The prior art hopper loaders have been of the hinged-tilting type requiring air cylinders for operation and in some instances the hopper loader has been balanced directly on the hopper, a situation which requires a crane or forklift for removal of the loader for any servicing of the machine or hopper.

An embodiment of my invention is illustrated in the accompanying drawings wherein:

FIG. 3 is a front view taken on the line 3—3 of FIG. 1.

FIG. 4 is a view of the apparatus near the bottom of the hopper taken at the line 4—4 of FIG. 3.

FIG. 5 is a view of the mounting for the hopper loader including the movable platform which supports the hopper loader.

Figure 1:
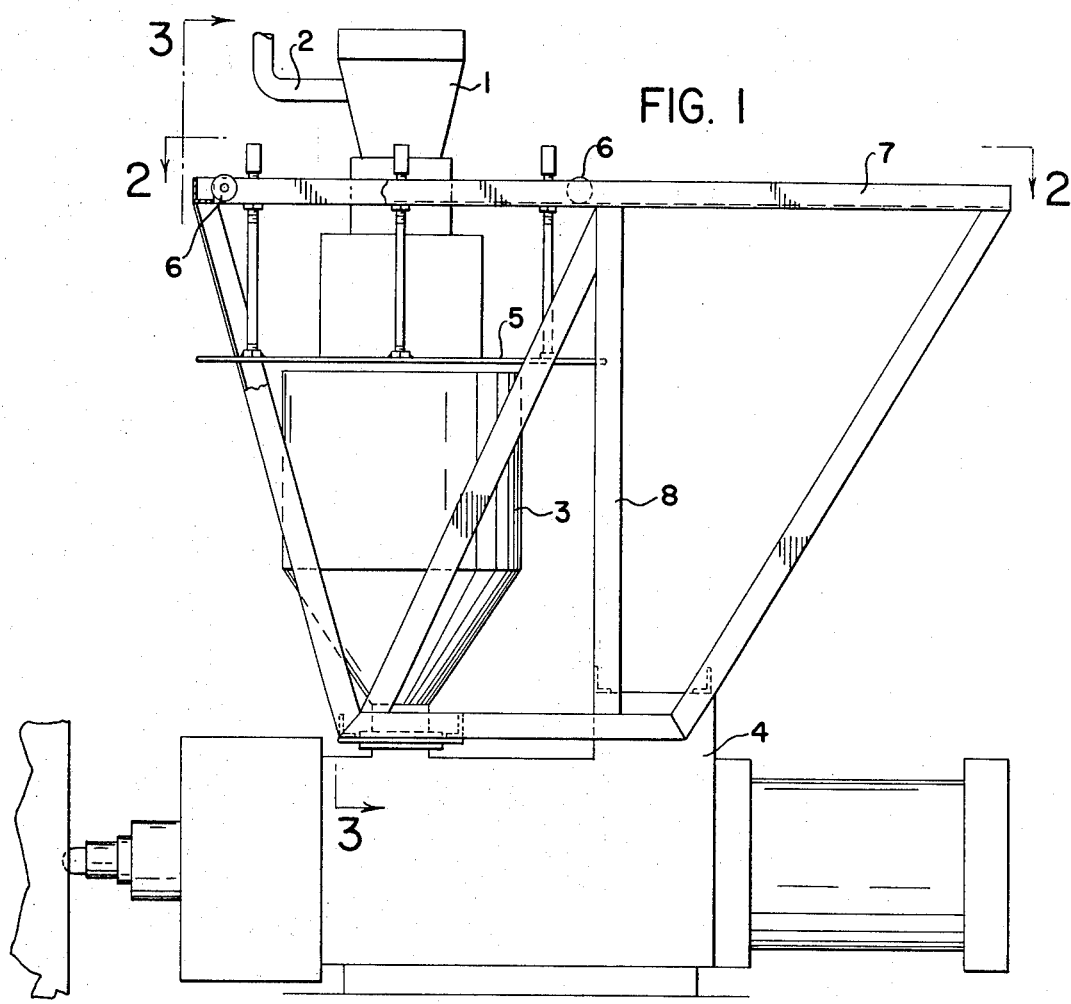
FIG. 1 is a side elevation, partly in section, of part of an extruder, the hopper, the hopper loader, and the mounting for the hopper loader.
Figure 2:
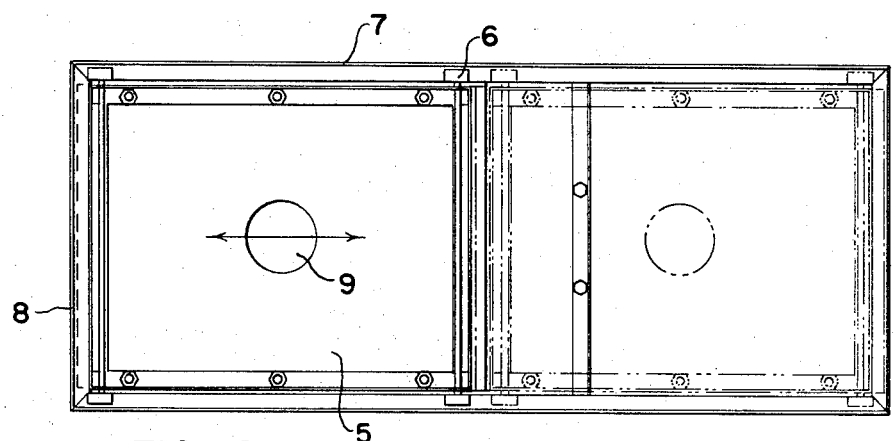
FIG. 2 is a top view of the hopper loader and mounting frame showing the hopper loader in two positions.

The hopper loader 1 mechanically transfers resin such as polyethylene, polypropylene, polyvinyl chloride, polystyrene, polymethyl methacrylate, ABS resin, and the like in the form of granules or powder from a storage area not shown through line 2 which is preferably flexible into the hopper 3 which is mounted above the screw or ram area of an extruder 4. The hopper loader is mounted on a platform 5 which is movably engaged by means of wheels 6 to the parallel tracks 7 located at the upper part of the supporting frame 8. The bottom section of the hopper loader rests in an opening 9 in the platform 5. Thus, the hopper loader is easily moved from a position directly above the hopper as shown in FIG. 1 to a position away from the top of the hopper as shown in FIG. 2, dotted line.

It is well known to those skilled in the art that in the ordinary course of the plastic extrusion operation it is necessary, from time to time, to dismantle the front part of the extruder to clean the screw or plunger at which time it is equally helpful not to have to dismount the hopper loader. According to my invention, the hopper loader platform is simply rolled to the back of the mounting or the tracks and stored in this position (as shown in FIG. 2, dotted lines) while the screw or plunger is cleaned or repaired. When the new screw is in place, the machine is reassembled, and then hopper loader and platform are rolled back in position above the hopper as shown in FIG. 1 for the commencement of the extrusion operation.

I claim:

1. In an extrusion apparatus for the extrusion of plastic strands, rods, tubes, pipes and the like, equipped with a screw or plunger extrusion means and a top-loading hopper located above the area of said extrusion means for supplying plastic material into the extrusion machine, the improvement comprising a hopper loader mounted on a platform which is movably mounted on a frame attached to the extrusion apparatus said hopper loader being readily moved into and out of engagement with the top of the hopper.

2. The apparatus of claim 1 wherein the platform is equipped with wheels which are movably engaged with parallel tracks located at the upper part of the frame.

3. The apparatus of claim 2 wherein the hopper loader transfers resin in the form of granules or powder from a storage area to the hopper.

* * * * *